(12) United States Patent
Yang et al.

(10) Patent No.: US 8,526,521 B2
(45) Date of Patent: Sep. 3, 2013

(54) APPARATUS AND METHOD FOR COMPENSATING FOR PHASE NOISE IN A RECEIVER SUPPORTING OFDM

(75) Inventors: Hyun-Koo Yang, Seoul (KR); Hong-Sil Jeong, Seoul (KR); Seho Myung, Gyeonggi-do (KR); Kyeong-Cheol Yang, Seoul (KR); Myung-Kyu Lee, Ulsan (KR)

(73) Assignees: Samsung Electronics Co., Ltd (KR); Postech Academy Industry Foundation (KR)

( * ) Notice: Subject to any disclaimer, the term of this patent is extended or adjusted under 35 U.S.C. 154(b) by 305 days.

(21) Appl. No.: 13/105,501

(22) Filed: May 11, 2011

(65) Prior Publication Data

US 2011/0280351 A1    Nov. 17, 2011

(30) Foreign Application Priority Data

May 11, 2010    (KR) .................. 10-2010-0044180

(51) Int. Cl.
*H04L 27/28*    (2006.01)

(52) U.S. Cl.
USPC .................................. 375/260; 375/346

(58) Field of Classification Search
USPC .................................. 375/260, 346
See application file for complete search history.

(56) References Cited

U.S. PATENT DOCUMENTS

| | | | | |
|---|---|---|---|---|
| 2008/0273641 A1* | 11/2008 | Yang et al. | .................. | 375/359 |
| 2010/0239033 A1* | 9/2010 | Shiue et al. | .................. | 375/260 |
| 2010/0303140 A1* | 12/2010 | Tseng | .................. | 375/227 |
| 2012/0121003 A1* | 5/2012 | Kleider et al. | .................. | 375/229 |

\* cited by examiner

*Primary Examiner* — Don N Vo
(74) *Attorney, Agent, or Firm* — The Farrell Law Firm, P.C.

(57) ABSTRACT

An apparatus and method for compensating for phase noise in a receiver supporting Orthogonal Frequency Division Multiplexing (OFDM) by receiving a frequency-domain recovered signal and a time-domain received signal, estimating an average phase noise for each of the partial blocks of the signals, calculating an overall average phase noise using the average phase noises of the partial blocks, and removing the phase noise from the time-domain received signal using the calculated total average phase noise.

20 Claims, 4 Drawing Sheets

APPARATUS AND METHOD FOR COMPENSATING FOR PHASE NOISE IN A RECEIVER SUPPORTING OFDM

PRIORITY

This application claims priority under 35 U.S.C. §119(a) to an application filed in the Korean Intellectual Property Office on May 11, 2010 and assigned Serial No. 10-2010-0044180, the entire disclosure of which is incorporated herein by reference.

BACKGROUND OF THE INVENTION

1. Field of the Invention

The present invention relates generally to an apparatus and method for compensating for phase noise in a receiver supporting Orthogonal Frequency Division Multiplexing (OFDM), and more particularly, to an apparatus and method for compensating for phase noise by removing the phase noise.

2. Description of the Related Art

In general, OFDM is a transmission scheme having high spectral efficiency, which can handle the time spread of a channel. OFDM has been recently adopted for a variety of communication standards, for example, in the high-speed Wireless Local Area Network (WLAN) and European Digital Video Broadcast (DVB) communication standards.

In a typical communication system, a pre-defined signal such as a pilot signal is used for synchronization acquisition, frequency offset estimation, channel estimation, etc. The pre-defined signal may suffer phase noise during transmission and reception. Phase noise is rather complicated, relative to a frequency offset, and significantly affects system performance.

In an OFDM system, phase noise generated from an oscillator of a transmitter or a receiver causes inter-subcarrier interference. To cancel the inter-subcarrier interference, complex equalization is required.

Accordingly, there exists a need for a method for estimating phase noise and compensating for the estimated phase noise at a receiver in order to improve system performance in a communication system.

SUMMARY OF THE INVENTION

An aspect of the present invention is to address at least the problems and/or disadvantages and to provide at least the advantages described below. Accordingly, an aspect of the present invention is to provide an apparatus and method for repeatedly compensating for phase noise, using output information of a channel decoder in an OFDM receiver.

Another aspect of the present invention is to provide an apparatus and method for dividing an OFDM block into a plurality of partial blocks, estimating phase noise using the partial blocks, and compensating for the estimated phase noise in an OFDM receiver.

A further aspect of the present invention is to provide an apparatus and method for compensating for phase noise included in a received signal using phase noise estimated from each of a plurality of partial blocks obtained by dividing a recovered received signal in an OFDM receiver.

In accordance with an embodiment of the present invention, there is provided a method for compensating for phase noise in a receiver supporting Orthogonal Frequency Division Multiplexing (OFDM), in which a frequency-domain recovered signal and a time-domain received signal are received, an average phase noise is estimated for each of partial blocks of the signals, an overall average phase noise is calculated using the average phase noises of the partial blocks, and phase noise is removed from the time-domain received signal using the calculated total average phase noise.

In accordance with another embodiment of the present invention, there is provided an apparatus for compensating for phase noise in a receiver supporting OFDM, in which a phase noise calculator receives a frequency-domain recovered signal and a time-domain received signal, estimates an average phase noise for each of partial blocks of the signals, and calculates an overall average phase noise using the average phase noises of the partial blocks, and a phase noise remover removes phase noise from the time-domain received signal using the calculated total average phase noise.

BRIEF DESCRIPTION OF THE DRAWINGS

The above and other objects, features and advantages of certain embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Various embodiments of the present invention will be described in detail below with reference to the accompanying drawings. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, detailed descriptions of a generally known functions and structures of the present invention will be omitted for clarity and conciseness. The terms described below are defined in connection with the function of the present invention. The meaning of the terms may vary according to the user, the intention of the operator, usual practice, and the like.

In general, an Orthogonal Frequency Division Multiplexing (OFDM) system performs channel estimation to compensate for the amplitude and phase distortion of a symbol by using a training symbol or a pilot signal.

Signal transmission operation of a transmitter, for channel estimation, in an OFDM system is described below. It is assumed herein that, one of error correction codes under extensive study, a Low-Density Parity-Check (LDPC) code is used as a coding scheme.

A binary information vector z of length B is converted to a binary codeword vector x of length C by an LDPC encoder with a code rate R=B/C. Next, the bits of each codeword in the binary codeword vector x are mapped to modulation symbols on a signal constellation by a mapper. The modulation symbols are combined with pilot symbols (or training symbols), thus producing a symbol vector w of length N in the frequency domain.

The symbol vector w is converted into a time-domain transmission vector t after serial-to-parallel conversion and N-point Inverse Discrete Fourier Transform (IDFT). The time-domain transmission vector t of length N is referred to as an OFDM symbol block.

An $i^{th}$ component of the OFDM symbol block may be given by Equation (1):

$$t_i = \frac{1}{\sqrt{N}} \sum_{k=0}^{N-1} w_k \exp\left(\frac{j2\pi}{N} ki\right) \tag{1}$$

where i satisfies the condition that $0 \leq i < N$.

To avoid interference between OFDM symbol blocks, a guard interval is set using last components $\{t_i\}_{i=N-N_{CP}}^{N-t}$ of the transmission vector t. The guard interval is referred to as a Cyclic Prefix (CP). $N_{CP}$ is a CP length.

The CP is serially concatenated with the transmission symbol vector t in the time domain and the resulting concatenated signal is transmitted on multi-path channels.

Figure 1:
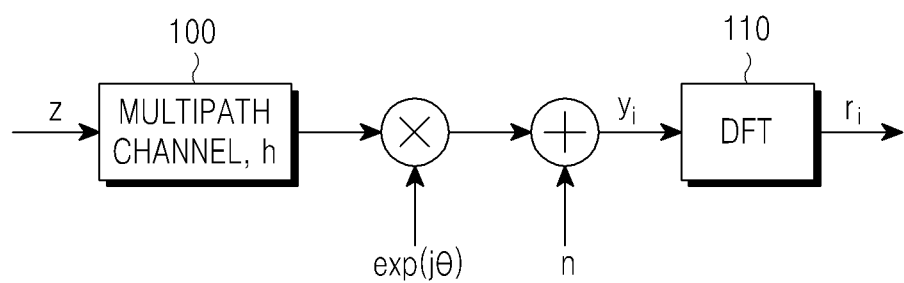
FIG. 1 is a diagram illustrating the configuration of a receiver for eliminating a noise component in an Orthogonal Frequency Division Multiplexing (OFDM) system.

FIG. 1 illustrates the configuration of a receiver for eliminating a noise component in an OFDM system.

Referring to FIG. 1, a time-domain component y, received on multi-path channels 100 is expressed with Equation (2):

$$y_i = \exp(j\phi_i) \sum_{l=0}^{L-1} h_l t_{(i-1)N} + n_i \tag{2}$$

$$-N_{CP} \leq i < N$$

where $\phi_i$ denotes phase noise generated in the interval of the $i^{th}$ component and $h_l$ denotes the channel coefficient of an $l^{th}$ path. It is assumed herein that the channel coefficient is not changed within an OFDM symbol.

The received components $\{y_i\}_{i=0}^{N-1}$ of Equation (2) are converted into frequency-domain components through N-point Discrete Fourier Transformer (DFT) 110. An $i^{th}$ frequency-domain component $r_i$ may be given by Equation (3):

$$r_i = w_i \overline{H}_i J_0 + \sum_{l=0,l \neq i}^{N-1} w_l \overline{H}_l J_{i-l} + v_i \tag{3}$$

where $\overline{H}_i$ denotes an $i^{th}$ diagonal component of a channel matrix $\overline{H}$ in the frequency domain and $\{J_i\}_{i=0}^{N-1}$ denotes the DFT coefficient of phase noise $\{\exp\{\phi_i\}\}_{i=0}^{N-1}$.

The phase noise is defined by Equation (4):

$$J_i = \frac{1}{N} \sum_{k=0}^{N-1} \exp(\phi_k) \exp\left(-\frac{2\pi ki}{N}\right) \tag{4}$$

As noted from Equation (4), each received component $r_i$ suffers signal distortion $J_0$ and Inter-Carrier Interference (ICI) due to the phase noise. Because the signal distortion $J_0$ commonly affects transmitted components $w_i$ in all received components $r_i$, it is known as the Common Phase Error (CPE).

The phase noise $\phi_i$ that determines the CPE in Equation (4) is modeled as a Wiener process.

The phase noise $\phi_i$ is determined by Equation (5):

$$\phi_i = \phi_{i-1} + \mu_i \tag{5}$$

where $\mu_i$ denotes a Gaussian probability variable with mean zero and variance $\sigma_\mu^2$, representing a variation in the phase noise of the $i^{th}$ component interval.

For example, where a 3-dB bandwidth of phase noise denoted by $f_{3dB}$ and the bandwidth of a subcarrier denoted by $f_{carr}$, then the variance $\sigma_\mu^2$ of the probability variable $\mu_i$ is $2\pi f_{3dB}/f_{carr}$. $f_{3dB}/f_{carr}$ is referred to as a Relative Phase-noise Bandwidth (RPB) and is used as a measure for indicating the strength of phase noise.

In FIG. 1, phase noise $\exp(j\theta)$ is estimated using a training symbol or a pilot symbol included in the received components $y_i$ and removed from the time-domain received signal. ICI-caused noise n is removed from the phase noise-removed received signal, thus producing a noise-free received signal y. The noise-free received signal y is converted into a frequency-domain received signal r through DFT 110.

As stated above, the receiver can be aware of generation of the signal distortion $J_0$ and ICI. The present invention is intended to provide a method for efficiently removing the signal distortion $J_0$.

One way of compensating for phase noise in the OFDM system is to estimate the signal distortion $J_0$ using a pilot signal included in an OFDM symbol and compensate for the distortion of transmitted components using the estimated the signal distortion $J_0$. The ICI is regarded as additional noise.

For instance, the signal distortion $J_0$ may be estimated using a Least-Square algorithm in Equation (6):

$$\hat{J}_0 = \left(\sum_{a \in S_P} (\overline{H}_a w_a)^* r_a\right) / \left(\sum_{a \in S_P} |\overline{H}_a w_a|^2\right) \tag{6}$$

where $S_P$ is a set of subcarriers carrying pilot components.

Despite its simplicity, the compensation method defined by Equation (6) may cause severe performance degradation in view of a large error between the average phase noise $J_0$ and an actual phase noise.

In accordance with an embodiment of the present invention, one OFDM symbol block is divided into a plurality of partial blocks and the average of phase noises (referred to as an average phase noise) is estimated for each partial block. Then the phase noise of a received signal is compensated for, using the estimated average phase noise of each partial block. Therefore, the performance degradation caused by an estimation error can be reduced, compared to phase noise compensation based on the average phase noise $J_0$ only. Based on this principle, an iterative processing-based OFDM receiver for effectively compensating for phase noise can be provided.

Figure 2:
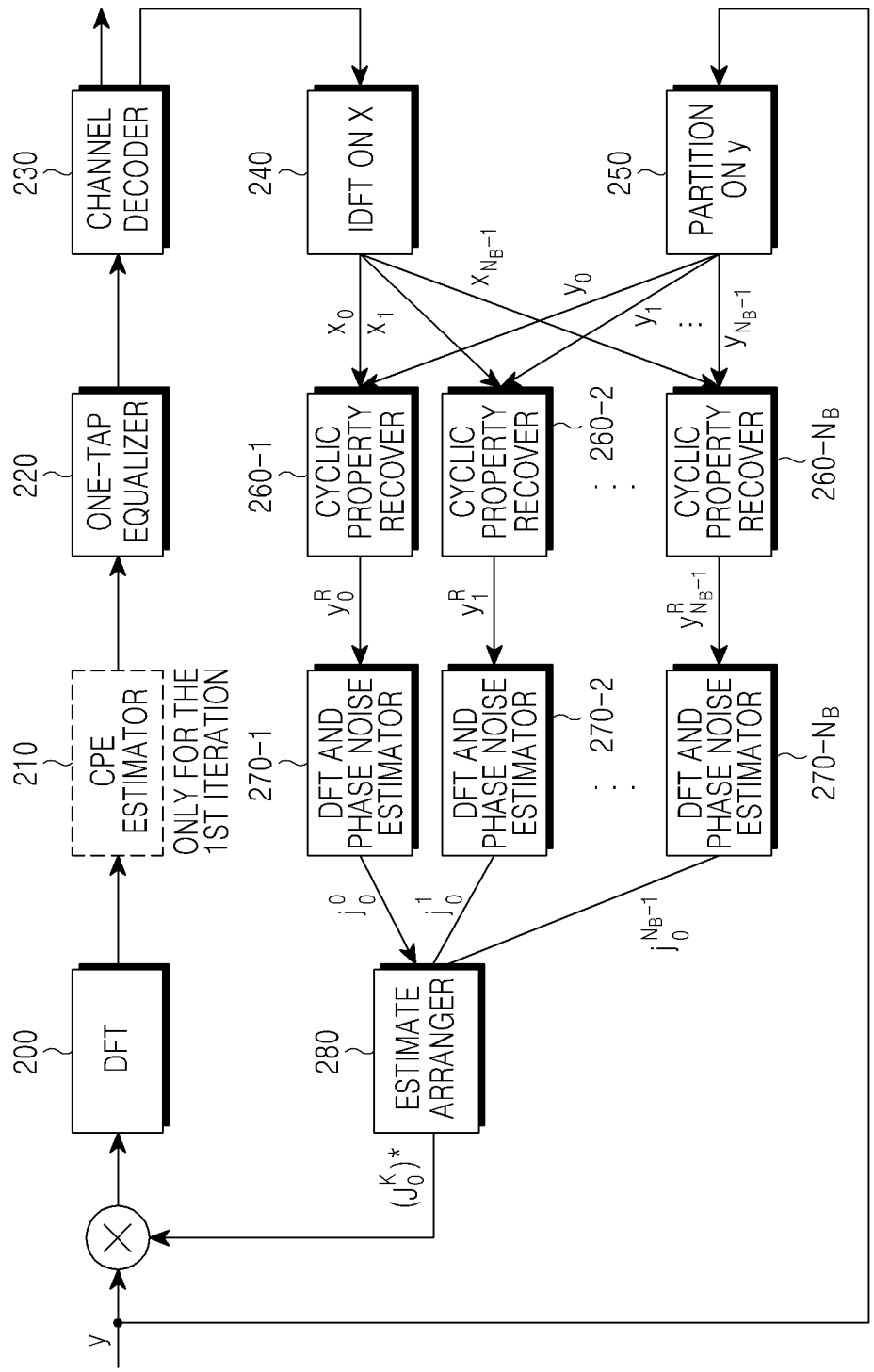
FIG. 2 is a block diagram illustrating a receiver in an OFDM system according to an embodiment of the present invention.

FIG. 2 is a block diagram of a receiver in an OFDM system according to an embodiment of the present invention.

Referring to FIG. 2, a CPE estimator 210 estimates a CPE from a frequency-domain signal received from a DFT 200 and a one-tap equalizer 220 detects transmitted components in the signal received from the CPE estimator 210. Then a channel decoder 230 performs channel decoding. At a subsequent iteration, an OFDM symbol block is divided into $N_B$ partial blocks. For the block segmentation, an IDFT 240 converts a frequency-domain recovered signal x to a time-domain recovered signal and divides the time-domain recovered signal into $N_B$ partial blocks $x_0 \ldots x_{N_B-1}$. A partitioner 250 divides the time-domain received signal y into $N_B$ partial blocks $y_0 \ldots y_{N_B-1}$. Cyclic property recoverers 260-1 to 260-$N_B$ receive a time-domain recovered partial block signal for each partial block and generate estimated partial block signals $y_0^R \ldots y_{N_B-1}^R$. DFTs and phase noise estimators 270-1 and 270-$N_B$ convert the respective partial block signals to frequency-domain signals and estimate the average phase noise $j_0^0 \ldots j_0^{N_B-1}$ of each of partial blocks corresponding to the frequency-domain partial block signals. An estimate arranger 280 calculates an overall average phase noise $(J_0^k)^*$ using the average phase noises of the partial blocks.

A received component vector $y_k$ corresponding to a $k^{th}$ partial block is given in Equation (7):

$$y_k = [y_{kS}, y_{kS+1}, \ldots, y_{kS+S-1}]^T \qquad (7)$$

where $S \triangleq N/N_B$ is the number of received components included in the partial block.

The received component vector $y_k$ of Equation (7) may be expressed in Equation (8):

$$y_k = P_k H_1 z_k + P_k H_2 z_{k-1} + n_k \qquad (8)$$

where $z_k = [z_{kS}, z_{kS+1}, \ldots, z_{kS+S-1}]^T$ and $n_k = [n_{kS}, n_{kS+1}, \ldots, n_{kS+S-1}]^T$.

In Equation (8), $P_k$ is a diagonal matrix representing phase noise and $H_1$ and $H_2$ are matrices of channel coefficients in the time domain.

The diagonal matrix $P_k$ and the matrices of channel coefficients $H_1$ and $H_2$ are determined by Equations (9)-(11):

$$P_k = \begin{bmatrix} \exp(j\phi_{kS}) & & & \\ & \exp(j\phi_{kS+1}) & & \\ & & \ddots & \\ & & & \exp(j\phi_{kS+S-1}) \end{bmatrix} \qquad (9)$$

$$H_1 = \begin{bmatrix} h_0 & 0 & \ldots & & & 0 \\ h_1 & h_0 & 0 & \ldots & & 0 \\ h_2 & h_1 & h_0 & 0 & \ldots & 0 \\ & & & \ddots & & \\ & & & & \ddots & \\ 0 & \ldots & 0 & h_{L-1} & \ldots & h_0 \end{bmatrix} \qquad (10)$$

$$H_2 = \begin{bmatrix} 0 & \ldots & 0 & h_{L-1} & \ldots & h_1 \\ 0 & & \ldots & 0 & \ddots & \vdots \\ 0 & & \ldots & & \ddots & h_{L-1} \\ & & & & \ddots & 0 \\ & & & & & \vdots \\ 0 & & \ldots & & & 0 \end{bmatrix} \qquad (11)$$

If a received signal in an embodiment of the present invention is divided into partial blocks in the frequency domain, each partial block including frequency components, the received components $y_k$ and the transmitted components $z_k$ are not in a cyclic relationship. As noted in Equation (8) transmitted components $z_{k-1}$ cause symbol interference.

To reduce symbol interference-caused distortion, it is necessary to apply a Residual ISI Cancellation (RISIC) algorithm to the received components $y_k$. The RISIC algorithm includes interference cancellation and component reconfiguration, expressed in Equation (12):

$$y_k^R = y_k + \hat{P}_k H_2 \hat{z}_k - \hat{P}_k H_2 \hat{z}_{k-1} \qquad (12)$$

where $\hat{P}_k$ is an estimate of $P_k$, calculated from an estimated phase noise obtained during the previous iteration, and $\hat{z}_k$ is an estimate of $z_k$, resulting from IFDT of an estimate of w calculated at a decoder.

As described above, because phase noise affects a received signal, the effects of the phase noise need to be additionally considered besides conventional RISIC.

Figure 3:
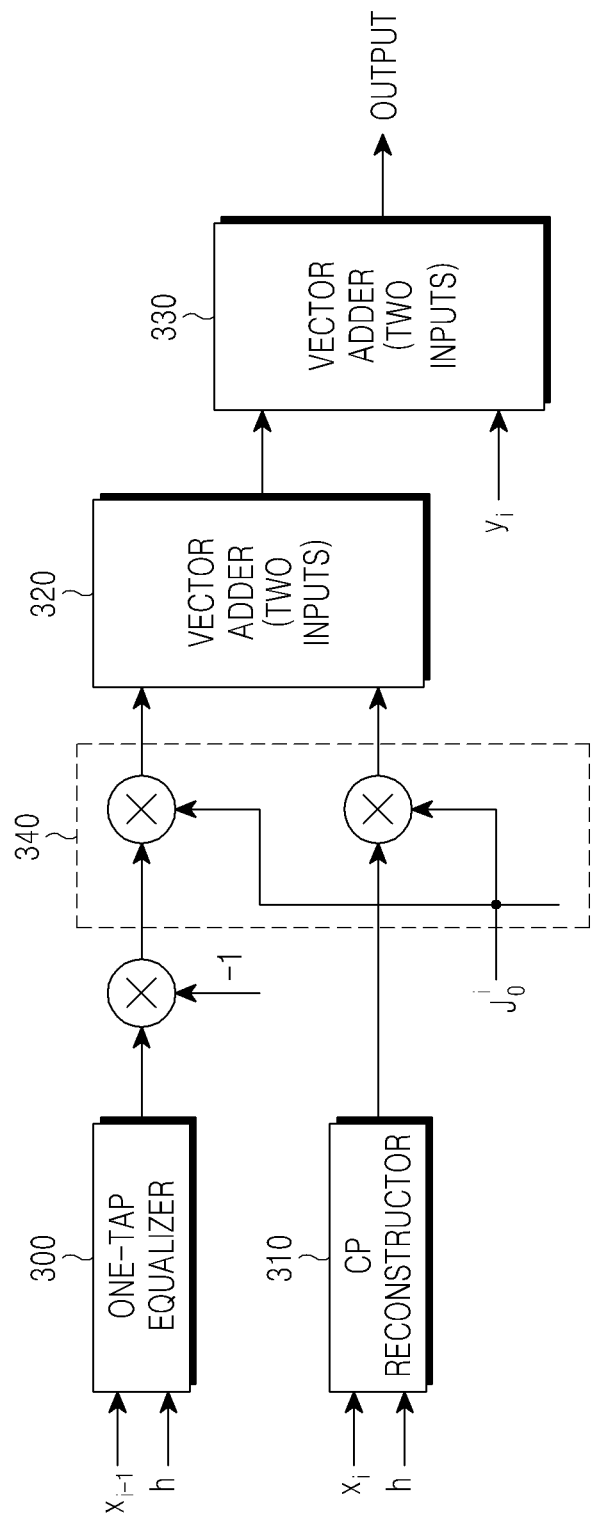
FIG. 3 is a diagram illustrating a configuration for acquiring a received signal, taking into account effects of phase noise in addition to Residual Inter-Symbol Interference Cancellation (RISIC) according to an embodiment of the present invention.

FIG. 3 illustrates a configuration for acquiring a received signal, taking into account the effects of phase nose in addition to RISIC according to an embodiment of the present invention. Equation (12) is implemented as the configuration illustrated in FIG. 3.

In FIG. 3, a one-tap equalizer 300, a CP reconstructor 310, and vector adders 320 and 330 are function blocks that operate according to a known RISIC algorithm. Therefore, a detailed description of the one-tap equalizer 300, the CP reconstructor 310, and the vector adders 320 and 330 will not be provided herein. In accordance with an embodiment of the present invention, a configuration 340 for multiplying a CPE $J_0$ by the input of the vector adder 320 is additionally provided between the one-tap equalizer 300 & the CP reconstructor 310 and the vector adder 320 in order to take the effect of phase noise.

Frequency components needed to estimate an average phase noise that has occurred to a $k^{th}$ partial block may be obtained by applying S-point DFT to the vector $y_k^R$. An $i^{th}$ frequency component may be determined by Equation (13):

$$r_i^k = \overline{H}_a^B w_a^k J_0^k + \sum_{l=0, l \neq i}^{S-1} \overline{H}_l^B w_l^k J_{a-1}^k + v_i^k \qquad (13)$$

where $\overline{H}_i^B$, $w_i^k$ and $J_i^k$ are defined by Equation (14):

$$\overline{H}_i^B = \sum_{l=0}^{L-1} h_l \exp\left(-\frac{2\pi li}{S}\right) \qquad (14)$$

$$w_i^k = \frac{1}{\sqrt{S}} \sum_{n=0}^{S-1} z_{kS+n} \exp\left(-\frac{j2\pi ni}{S}\right)$$

$$J_i^k = \frac{1}{S} \sum_{n=0}^{S-1} \exp(j\phi_{kS+n}) \exp\left(-\frac{2\pi ni}{S}\right)$$

where $v_i^k$ represents the DFT component of noise $n_k$ and an error generated during the RISIC process. And $J_0^k$ represents the average phase noise of the $k^{th}$ partial block, computed by Equation (15) using the estimate of $w_i^k$, $\hat{w}_i^k$ according to the Least-Square algorithm:

$$\hat{J}_0^k = \left(\sum_{a=0}^{S-1} (\overline{H}_a^B \hat{w}_a^k)^* r_a^k\right) \bigg/ \left(\sum_{a=0}^{S-1} |\overline{H}_a^B \hat{w}_a^k|^2\right) \qquad (15)$$

As noted from FIG. 2, the phase noise is compensated for by multiplying the received components $y_k$ by the conjugate of the estimated $J_0^k$, $\hat{J}_0^k$. $\hat{J}_0^k$ which is calculated in a very similar manner to calculation of the CPE, $J_0$.

Figure 4:
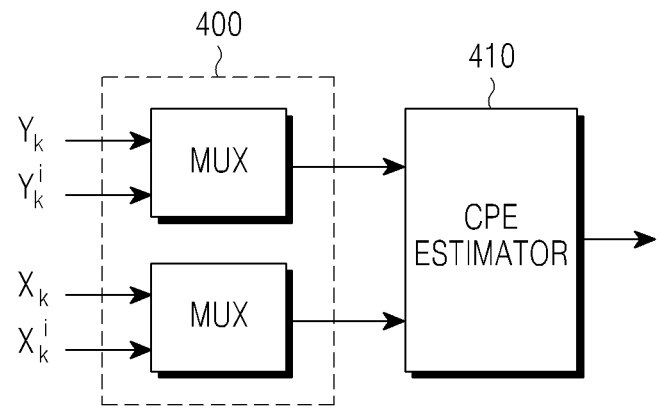
FIG. 4 is a diagram illustrating a configuration for calculating a common phase error according to an embodiment of the present invention.

FIG. 4 illustrates a configuration for calculating the CPE $J_0$ according to an embodiment of the present invention $\hat{J}_0^k$ computation can be efficiently implemented with hardware using the configuration of FIG. 4.

FIG. 4 includes a Multiplexer (MUX) 400 and a CPE estimator 410, for estimating the average phase noise of a $k^{th}$ partial block from the frequency-domain recovered signal and the time-domain received signal.

The phase noise-compensated received component vector is denoted by z and z may be expressed as Equation (16):

$$z = \begin{bmatrix} (\hat{J}_0^0)^* I_S & & & \\ & (\hat{J}_0^1)^* I_S & & \\ & & \ddots & \\ & & & (\hat{J}_0^{N_B-1})^* I_S \end{bmatrix} y \quad (16)$$

where $I_S$ is an identity matrix of size S.

As noted from Equation (16), the compensated received component vector z may be calculated by multiplying the time-domain received components by the diagonal matrix of the average phase noises of partial blocks.

Figure 5:
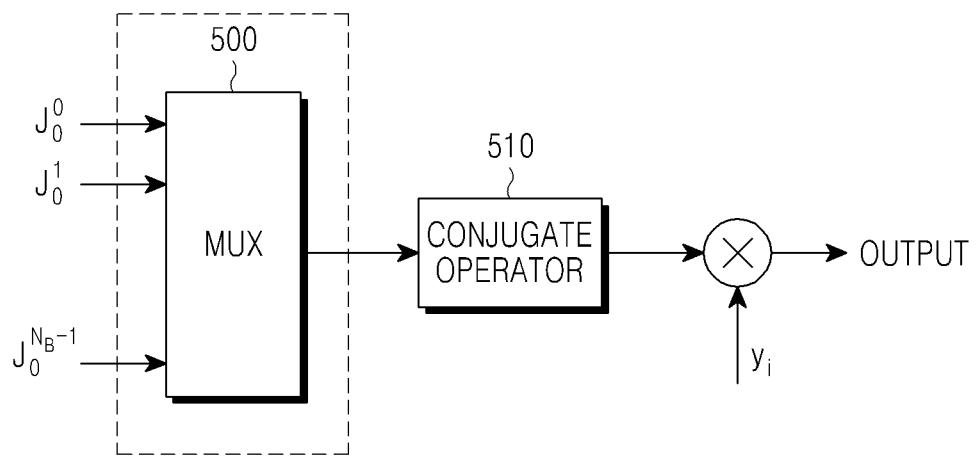
FIG. 5 is a diagram illustrating the configuration of an apparatus for implementing a compensation algorithm according to an embodiment of the present invention.

FIG. 5 illustrates the configuration of an apparatus for implementing the compensation algorithm of Equation (16) according to an embodiment of the present invention.

Referring to FIG. 5, the vector z is converted into frequency components through N-point DFT and transmitted components are re-detected from the frequency components using a single-tap equalizer. To increase the reliability of the recovered information, the afore-described phase noise compensation, one-tap equalization, and channel decoding are sequentially iterated a predetermined number of times.

That is, in FIG. 5, a MUX 500 multiplexes the average phase noises of respective partial blocks $\hat{j}_0^0 \ldots \hat{j}_0^{N_B-1}$ and a conjugate operator 510 calculates an overall average phase noise by conjugating the multiplexed average phase noise. Then a phase noise-free time-domain received signal is produced by multiplying the time-domain received signal $y_i$ by the overall average phase noise.

As is apparent from the above description of the present invention, phase noise in a receiver of an OFDM system can be efficiently removed, thereby increasing the performance of the OFDM system.

While the present invention has been particularly shown and described with reference to embodiments thereof, it will be understood by those of ordinary skill in the art that various changes in form and detail may be made therein without departing from the spirit and scope of the present invention as defined by the following claims.

What is claimed is:

1. A method for compensating for phase noise in a receiver supporting Orthogonal Frequency Division Multiplexing (OFDM), comprising:
    inputting a frequency-domain recovered signal and a time-domain received signal;
    estimating an average phase noise for each of partial blocks of the signals;
    calculating an overall average phase noise using the average phase noises of the partial blocks; and
    removing phase noise from the time-domain received signal using the calculated total average phase noise.

2. The method of claim 1, wherein the frequency-domain recovered signal is generated by converting the received time-domain signal into a received frequency-domain signal and estimating an average phase error from the received frequency-domain signal.

3. The method of claim 2, wherein the overall average phase noise calculation comprises:
    converting the recovered frequency-domain signal into a recovered time-domain signal;
    dividing the recovered time-domain signal into a predetermined number of partial blocks;
    dividing the received time-domain signal into a predetermined number of partial blocks;
    generating estimated partial block signals using the partial blocks of the recovered time-domain signal and the partial blocks of the received time-domain signal;
    converting the generated partial block signals into frequency-domain partial block signals and estimating an average phase noise for each of partial blocks corresponding to the frequency-domain partial block signals; and
    calculating the overall average phase noise using the average phase noise of each partial block.

4. The method of claim 3, wherein the overall average phase noise is calculated by multiplexing the average phase noises of the partial blocks and conjugating the multiplexed average phase noise.

5. The method of claim 4, wherein phase noise removal comprises multiplying the time-domain received signal by the calculated overall average phase noise.

6. The method of claim 5, wherein the overall average phase noise calculation and phase noise removal are sequentially repeated a predetermined number of times.

7. The method of claim 3, wherein the average phase noises of the partial blocks form a diagonal matrix satisfying the number of frequency components included in one partial block.

8. The method of claim 3, wherein the overall average phase noise takes the form of a diagonal matrix including the average phase noises of the partial blocks.

9. The method of claim 1, wherein the average phase noises of the partial blocks form a diagonal matrix satisfying the number of frequency components included in one partial block.

10. The method of claim 1, wherein the overall average phase noise takes the form of a diagonal matrix including the average phase noises of the partial blocks.

11. An apparatus for compensating for phase noise in a receiver supporting Orthogonal Frequency Division Multiplexing (OFDM), comprising:
    a phase noise calculator for inputting a frequency-domain recovered signal and a time-domain received signal, estimating an average phase noise for each of partial blocks of the signals, and calculating an overall average phase noise using the average phase noises of the partial blocks; and
    a phase noise remover for removing phase noise from the time-domain received signal using the calculated total average phase noise.

12. The apparatus of claim 11, further comprising a received signal recoverer for generating the frequency-domain recovered signal by converting the received time-domain signal into a received frequency-domain signal and estimating an average phase error from the received frequency-domain signal.

13. The apparatus of claim 12, wherein the phase noise calculator comprises:
- a recovered signal divider for converting the recovered frequency-domain signal into a recovered time-domain signal and dividing the recovered time-domain signal into a predetermined number of partial blocks;
- a received signal divider for dividing the received time-domain signal into a predetermined number of partial blocks;
- a recoverer for generating estimated partial block signals using the partial blocks of the recovered time-domain signal received from the recovered signal divider and the partial blocks of the received time-domain signal received from the received signal divider;
- a phase noise estimator for converting the generated partial block signals into frequency-domain partial block signals and estimating an average phase noise for each of partial blocks corresponding to the frequency-domain partial block signals; and
- a phase noise combiner for calculating the overall average phase noise using the average phase noise of each partial block.

14. The apparatus of claim 13, wherein the phase noise combiner comprises:
- a multiplexer for multiplexing the average phase noises of the partial blocks; and
- a conjugate operator for calculating the overall average phase noise by conjugating the multiplexed average phase noise.

15. The apparatus of claim 14, wherein the phase noise remover outputs a phase noise-removed time-domain received signal by multiplying the time-domain received signal by the calculated overall average phase noise.

16. The apparatus of claim 15, wherein the overall average phase noise calculation of the phase noise calculator and the phase noise removal of the phase noise remover are sequentially repeated a predetermined number of times.

17. The apparatus of claim 13, wherein the average phase noises of the partial blocks form a diagonal matrix satisfying the number of frequency components included in one partial block.

18. The apparatus of claim 13, wherein the overall average phase noise takes the form of a diagonal matrix including the average phase noises of the partial blocks.

19. The apparatus of claim 11, wherein the average phase noises of the partial blocks form a diagonal matrix satisfying the number of frequency components included in one partial block.

20. The apparatus of claim 11, wherein the overall average phase noise takes the form of a diagonal matrix including the average phase noises of the partial blocks.

* * * * *